Apr. 17, 1923.
H. A. FREY
HORSESHOE
Original Filed Jan. 5, 1921
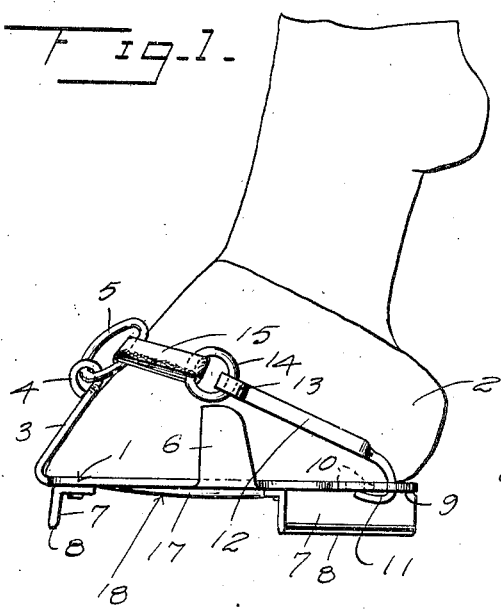
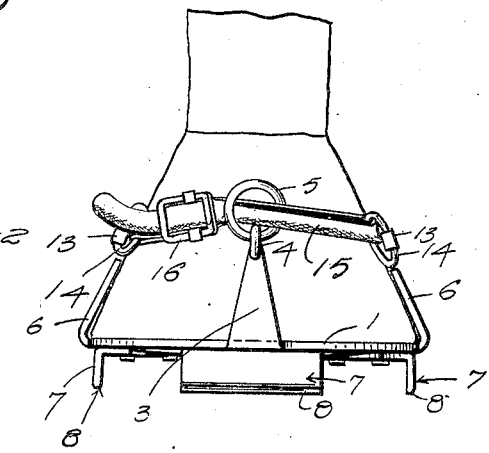
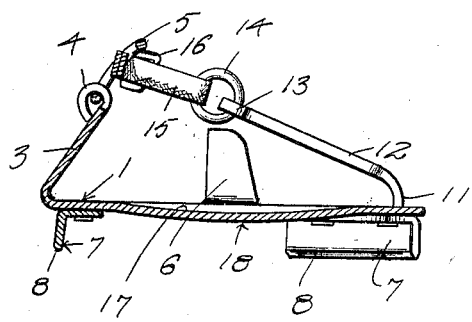
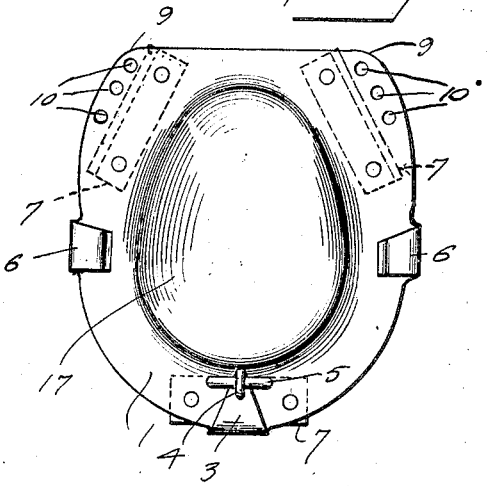
Inventor
H. A. Frey Patented Apr. 17, 1923.

1,451,905

UNITED STATES PATENT OFFICE.

HERMAN A. FREY, OF CHAMPAIGN, ILLINOIS.

HORSESHOE.

Application filed January 5, 1921, Serial No. 435,177. Renewed July 13, 1922. Serial No. 574,782.

*To all whom it may concern:*

Be it known that I, HERMAN A. FREY, a citizen of the United States, residing at Champaign, in the county of Champaign and State of Illinois, have invented certain new and useful Improvements in Horseshoes; and I do hereby declare the following to be a full, clear, and exact description of the invention, such as will enable others skilled in the art to which it appertains to make and use the same.

This invention relates to new and useful improvements in horseshoes of the character described, claimed, and illustrated in my application for United States Letters Patent filed July 26, 1919, Serial No. 313,487; and has for its primary object the provision of a novel means for securing the wear plate to the hoof of an animal and which means is capable of double adjustment, so that the device can be easily and quickly applied to hoofs of several sizes.

Another object of this invention is the provision of means which prevents ice, snow, or mud from clinging to the plate or filling the space between the calks.

A further object of this invention is the provision of a horseshoe of the above stated character, which shall be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation illustrating a horseshoe constructed in accordance with my invention and showing the same applied to a hoof;

Fig. 2 is a front elevation of the same;

Fig. 3 is a longitudinal sectional view, illustrating the concave of the wear plate; and Fig. 4 is a top plan view, illustrating the means of adjustably attaching the fastening strap to the wear plate.

Referring in detail to the drawing, the numeral 1 indicates a combined wear and protecting plate which is shaped to conform to an animal's hoof 2 and is of such shape and size that the hoof 2 will rest evenly upon said plate. A lip 3 is formed integrally with the front edge of the wear plate 1 and inclined upwardly and rearwardly to engage and conform to the front portion of the hoof 2 and has its extreme end bent upon itself to form an eye 4 that receives a ring 5.

Side lips 6 are formed integrally with the side edges of the wear plate 1 and are inclined upwardly and inwardly to engage the sides of the hoof 2 and cooperate with the front lip 3 in preventing the wear plate from shifting laterally on the hoof 2 during the walking of the animal.

A plurality of calks 7 are riveted or otherwise secured to the wear plate 1, and each is preferably constructed from angle-iron as clearly shown in the drawings so that one arm portion of the angle-iron forms an attaching face for the calk to the wear plate while the other arm is beveled as shown at 8 to furnish sharp faces on the calks 7.

Attaching plates 9 are formed integrally with the rear side edges of the wear plate 1 and are provided with spaced openings 10, which are adapted to receive hooks 11 formed on the ends of connecting elements 12. The connecting elements 12 are curved or bent to conform to the contour of the hoof 2, and they extend from the rear portion of the hoof 2 in an upwardly inclined plane in the direction of the forward portion and have their forward ends bent upon themselves to form eyes 13 that receive rings 14.

An anchoring strap 15 is passed through each of the rings 14 and also through the ring 5 and has its ends adjustably connected by a buckle 16, thus firmly securing the wear plate to the hoof.

The wear plate 1 in its top face is provided with a recess 17 and said recess is formed by compressing the plate between the calks so as to define a convexed outer face 18 to the wear plate which prevents mud, snow, ice, and the like from readily adhering to the plate and also aids in preventing the clogging of the calks with such matter during the use of the device.

From the foregoing description taken in connection with the accompanying drawing, it will be noted that by the strap 15 having the buckle 16 permits of one adjustment of the fastening means of the wear plate to the hoof, while the hooks 11 on the elements 12 and the openings 10 of the attaching plates 9 permit of another adjustment thereby allowing the device to be readily and quickly applied to hoofs of different sizes.

While I have shown and described the preferred embodiment of my invention, it will be understood that minor changes in construction, combination, and arrangement of parts may be made without departing from the spirit and scope of the invention as claimed.

Having thus described my invention, what I claim is:

1. A horseshoe comprising a plate, front and side lips formed on said plate and adapted to engage an animal's hoof, a ring secured to the front lip, calks secured to said plate, elements adjustably connected to said plate, rings carried by said elements, and a strap passing through the rings and having its ends adjustably connected.

2. A horseshoe comprising a plate, front and side lips on said plate, calks secured to said plate, a ring secured to the front lip, attaching plates formed integrally with the plate and having spaced openings, elements each having one of its ends bent to form a hook adapted to engage any of said openings of the adjacent attaching plate, rings secured to the other ends of said elements, and a strap passing through the second-named rings and first-named ring and having its ends adjustably connected.

3. A horseshoe including a tread member having a front lip, side members inclining towards the lip and adjustably secured to the sides of said tread member adjacent the latter's rear edge, and an attaching means slidably secured to the forward ends of said side members and to the lip.

4. A horseshoe including a tread member having a front lip, side members inclining towards the lip and adjustably secured to the sides of said tread member adjacent the latter's rear edge, and an attaching element capable of adjustment as to its length slidably connected to the side members and to the lip.

5. A horseshoe including a tread member having a front lip and openings arranged along its side edges adjacent to its rear edge, side members having hook-shaped ends extending through some of said openings, and an adjustable attaching element slidably connected to the side elements and to the lip.

6. A horseshoe including a tread member having a front lip, a ring secured to the lip, side members secured to the tread member, rings secured to the side members, and an attaching element passing through the rings and arranged transversely of an animal's hoof.

7. A horseshoe including a tread member having a front lip, a ring secured to the lip, side members secured to the tread member, rings secured to the side members, and an attaching element having its ends adjustably secured together and adapted to extend through the rings.

In testimony whereof I affix my signature in presence of two witnesses.

HERMAN A. FREY.

Witnesses:
 JESSE L. JONES,
 ELIZABETH MILDRED STICKLER.